United States Patent
Feldtkeller et al.

(10) Patent No.: US 10,256,630 B2
(45) Date of Patent: Apr. 9, 2019

(54) CONTROLLER DEVICE FOR POWER ELECTRONICS CIRCUIT

(71) Applicant: Infineon Technologies Austria AG, Villach (AT)

(72) Inventors: Martin Feldtkeller, Munich (DE); Reinhard Mueller, Unterhaching (DE)

(73) Assignee: Infineon Technologies Austria AG, Villach (AT)

( * ) Notice: Subject to any disclaimer, the term of this patent is extended or adjusted under 35 U.S.C. 154(b) by 0 days.

(21) Appl. No.: 15/608,066

(22) Filed: May 30, 2017

(65) Prior Publication Data
US 2018/0351357 A1 Dec. 6, 2018

(51) Int. Cl.
| H02J 3/00 | (2006.01) |
| H02M 3/335 | (2006.01) |
| H02H 3/20 | (2006.01) |
| H02P 23/26 | (2016.01) |

(52) U.S. Cl.
CPC ............ H02J 3/005 (2013.01); H02H 3/207 (2013.01); H02P 23/26 (2016.02)

(58) Field of Classification Search
CPC ........... H02J 3/005; H02P 23/26; H02H 3/207
USPC .................. 363/21.02–21.18, 123, 125, 127
See application file for complete search history.

(56) References Cited

U.S. PATENT DOCUMENTS

| 8,045,348 B2* | 10/2011 | Zhu | H02M 1/36 363/18 |
| 8,084,893 B2* | 12/2011 | Fujii | H02M 1/32 307/130 |
| 9,166,497 B2* | 10/2015 | Fujii | H02M 3/33507 |
| 9,685,875 B2* | 6/2017 | Nishijima | H02M 3/33523 |
| 2009/0268488 A1* | 10/2009 | Fujii | H02M 1/32 363/49 |
| 2011/0069420 A1* | 3/2011 | Chiu | H02M 1/36 361/91.1 |
| 2014/0368742 A1* | 12/2014 | Joo | H02M 1/4208 348/730 |
| 2015/0003122 A1* | 1/2015 | Cui | H02M 3/33507 363/21.18 |

(Continued)

OTHER PUBLICATIONS

Received STIC search report from EIC 2800 searcher Samir Patel on Apr. 23, 2018.*

(Continued)

*Primary Examiner* — Timothy J Dole
*Assistant Examiner* — Htet Z Kyaw
(74) *Attorney, Agent, or Firm* — Shumaker & Sieffert, P.A.

(57) ABSTRACT

In some examples, a controller device is configured to control power electronics circuitry and includes a high-voltage (HV) pin, a power supply (VCC) pin, a startup device configured to conduct electricity from the HV pin to the VCC pin, and comparator circuitry configured to determine whether a voltage level of the VCC pin is greater than a turn-on voltage threshold. In some examples, the comparator circuitry is further configured to cause the controller device to enter a normal-operation mode in response to determining that the voltage level of the VCC pin is greater than the turn-on voltage threshold. In some examples, the controller device also includes level detection circuitry configured to determine the turn-on voltage threshold based on a level of the HV pin.

20 Claims, 7 Drawing Sheets

(56) References Cited

U.S. PATENT DOCUMENTS

| | | | | |
|---|---|---|---|---|
| 2015/0048677 A1* | 2/2015 | Gong | ................. | H05B 33/0854 |
| | | | | 307/24 |
| 2015/0222176 A1* | 8/2015 | Asinovski | ............... | H02M 1/36 |
| | | | | 323/271 |
| 2015/0311197 A1* | 10/2015 | Saito | .................. | H01L 27/0611 |
| | | | | 323/282 |
| 2016/0133704 A1* | 5/2016 | Karino | ................. | H01L 29/808 |
| | | | | 257/272 |
| 2017/0005583 A1* | 1/2017 | Choi | ................ | H02M 3/33553 |
| 2017/0012542 A1* | 1/2017 | Nishijima | ......... | H02M 3/33523 |
| 2017/0310099 A1* | 10/2017 | Mirsky | .................... | H02H 3/20 |
| 2018/0102709 A1* | 4/2018 | Hari | ..................... | H02M 3/158 |

OTHER PUBLICATIONS

Received STIC search report from EIC 2800 searcher Mesfin Getaneh on May 9, 2018 for claim 20 and May 11, 2018 for claim 12 respectively.*

"High-Performance Current-Mode PWM Controllers," Texas Instruments, Aug. 2006, revised Jul. 2007, 24 pp.

"Digital Multi-Mode PFC + LLC Combo Controller," Infineon, IDP 2303, Feb. 2017, revised Mar. 21, 2017, 38 pp.

"TLx84x Current-Mode PWM Controllers," Texas Instruments, Jan. 1989, revised Jul. 2016, 27 pp.

* cited by examiner

CONTROLLER DEVICE FOR POWER ELECTRONICS CIRCUIT

TECHNICAL FIELD

This disclosure relates to controller devices for power electronics circuits.

BACKGROUND

A controller device (i.e., an integrated control circuit) for a switched-mode power supply (SMPS) circuit may support a family of converter types, such as a flyback converter circuit, a power factor correction (PFC) circuit, and/or a resonant mode converter circuit such as an LLC (inductor-inductor-capacitor) converter circuit. In some examples, a controller device for an SMPS circuit may be configured to control the operation of two or more conversion circuits of a power electronics device, such as a PFC stage and an LLC stage, or a PFC stage and a flyback stage.

A power electronics device may include one or more controller devices. For example, a power electronics device may include a separate controller device for a flyback stage that is configured to generate an auxiliary power supply for standby operation. The power electronics device may also include a main controller device configured to control a PFC stage and an LLC stage. Another power electronics device may include a single controller device that is configured to control the all of the conversion functions of the device.

SUMMARY

This disclosure describes a controller device for a power electronics device, where a turn-on voltage threshold of the controller device is adjustable based on the voltage level of a high-voltage (HV) pin of the controller device. In some examples, the under-voltage lockout (UVLO) threshold of the controller device may also be adjustable. The controller device may include level detection circuitry configured to detect the level (e.g., the voltage level or the current level) of the HV pin. The controller device may determine the turn-on voltage threshold based on the level of the HV pin. In some examples, the controller device may be configured to set a higher turn-on voltage threshold based on a higher voltage level or current level of the HV pin and/or to reset a lower turn-on voltage threshold based on a lower voltage level or current level of the HV pin.

In some examples, a controller device is configured to control power electronics circuitry and includes a high-voltage (HV) pin, a power supply (VCC) pin, a startup device configured to conduct electricity from the HV pin to the VCC pin, and comparator circuitry configured to determine whether a voltage level of the VCC pin is greater than a turn-on voltage threshold. In some examples, the comparator circuitry is further configured to cause the controller device to enter a normal-operation mode in response to determining that the voltage level of the VCC pin is greater than the turn-on voltage threshold. In some examples, the controller device also includes level detection circuitry configured to determine the turn-on voltage threshold based on a level of the HV pin.

In some examples, a method for controlling power electronics circuitry by a controller device includes determining a turn-on voltage threshold based on a level of an HV pin of the controller device. The method further includes determining whether a voltage level of a VCC pin of the controller device is greater than the turn-on voltage threshold. The method also includes causing the controller device to enter a normal-operation mode in response to determining that the voltage level of the VCC pin is greater than the turn-on voltage threshold.

In some examples, a power electronics device includes rectification circuitry configured to rectify AC electricity and PFC circuitry configured to receive the rectified AC electricity from the rectification circuitry. The power electronics device also includes SMPS circuitry configured to generate a main power supply and a controller device configured to control the PFC circuitry and the SMPS circuitry. The controller device includes a VCC pin and an HV pin configured to receive the rectified AC electricity from the rectification circuitry and to pre-charge the VCC pin during a startup sequence. The controller device also includes a startup device configured to deliver the rectified AC electricity from the HV pin to the VCC pin. The controller device further includes comparator circuitry configured to determine whether a voltage level of the VCC pin is greater than a turn-on voltage threshold. The comparator circuitry is also configured to cause the controller device to enter a normal-operation mode in response to determining that the voltage level of the VCC pin is greater than the turn-on voltage threshold. The controller device includes level detection circuitry configured to determine the turn-on voltage threshold based on a level of the HV pin.

The details of one or more examples are set forth in the accompanying drawings and the description below. Other features, objects, and advantages will be apparent from the description and drawings, and from the claims.

DETAILED DESCRIPTION

Figure 1:
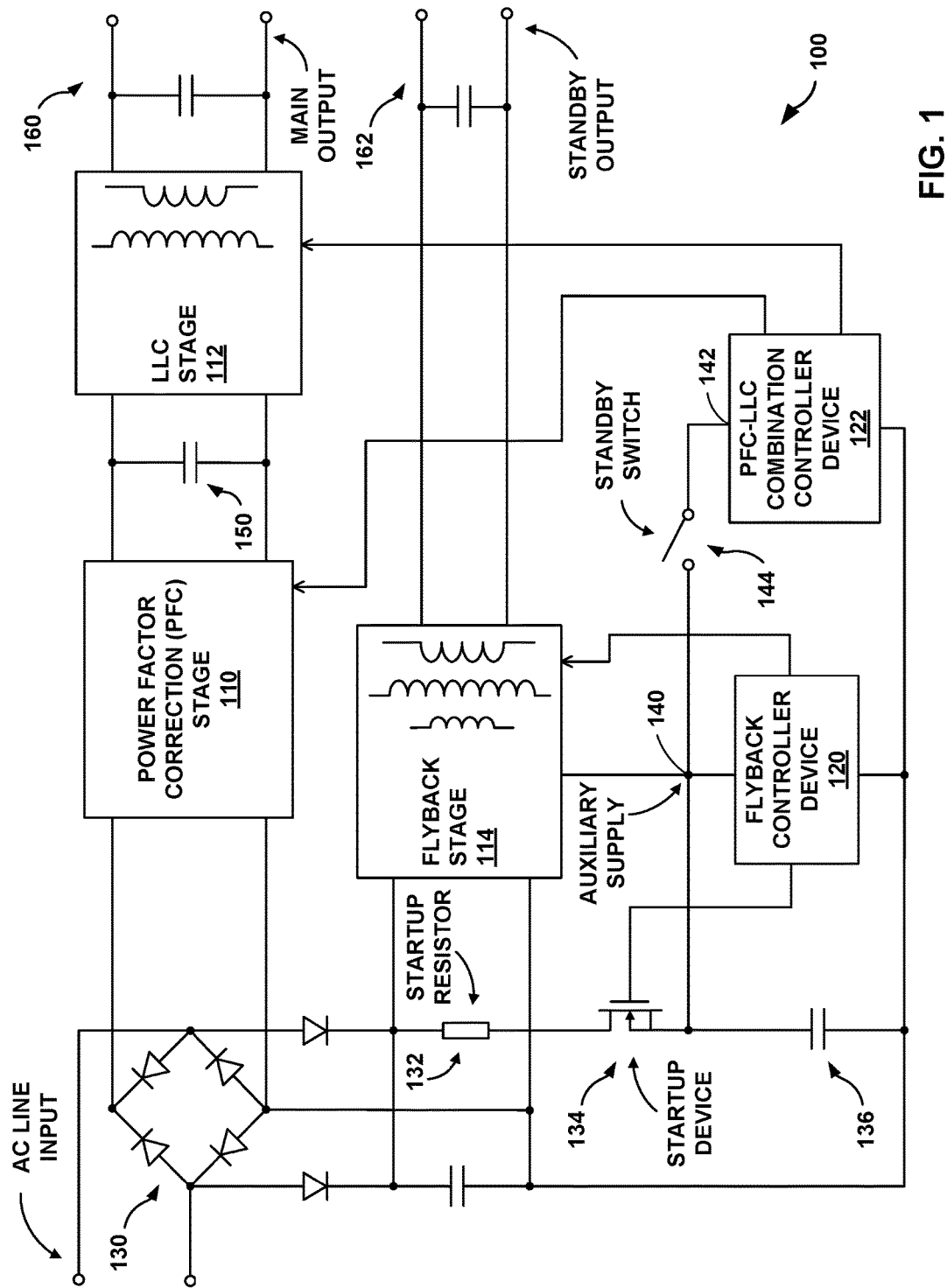
FIG. 1 is circuit and block diagram of a power electronics device including two controller devices, in accordance with some examples of this disclosure.

The design of a power electronics device may influence the startup sequence for the conversion circuits of the system. The startup sequence may define which controller device has to start up first, if the system includes multiple controller devices. During the startup of the first controller device, a low-voltage supply (e.g., an auxiliary power supply) may not be available. As a result, a rectified AC-line voltage may pre-charge the power supply for the first controller device before the first controller device can start to operate and control the operation of one or more converter circuits.

One technique of pre-charging the power supply for a controller device includes using a startup resistor that connects the power supply for the controller device to the rectified AC-line voltage. The electrical current through the startup resistor may be very low, for example in a range from ten microamperes to one hundred microamperes, in order to reduce the power dissipation. In some examples, where the startup electrical current can be turned off, the startup electrical current may be higher, such as in the range from one milliampere to five milliamperes. For turning off the startup current, the power electronics device may include a startup device such as a switch that is initially on (e.g., closed). In some examples, the startup device comprises a depletion field-effect transistor (FET) or a junction gate FET (JFET), although other types of switches may also be used. Moreover, in some examples, the power electronics device may include a depletion FET or a JFET configured as a single startup current source without a series resistor.

When the controller device starts operating, it may be configured to draw a supply current in the order of two milliamperes to ten milliamperes. During normal operation, the SMPS circuit may be configured to generate a power supply for the controller device through an auxiliary winding on an SMPS transformer. From the time when the controller device starts operating until the auxiliary supply is available, there may be a delay in the order of fifty milliseconds. The power electronics device may include a capacitor configured to store electrical energy that the controller device may use to operate during the startup delay time. The power electronics device may pre-charge the capacitor with the rectified AC electricity before the controller device starts to operate.

The ratio of the pre-charging time and the time from startup of the controller device until the availability of the auxiliary supply may be a desirable parameter to define or configure in the device. A large under-voltage lockout (UVLO) hysteresis may improve this ratio by creating a large gap between the turn-on voltage threshold and the under-voltage lockout (UVLO) threshold (e.g., the hysteresis thresholds). When the voltage across the capacitor reaches the turn-on voltage threshold (e.g., the VCCon threshold), the controller device may be configured to start operating. When the voltage across the capacitor reaches the UVLO threshold, the controller device may be configured to stop operating by transitioning to a startup mode, which may conserve power. The voltage across the capacitor may reach the UVLO threshold because the auxiliary supply voltage declines if the auxiliary power supply fails for some reason. A typical turn-on threshold, which may be expressed as "VCCon," for a controller device may be in the range from sixteen volts to twenty-five volts. A typical UVLO threshold, which may be expressed as "VCCoff," may be in the range from seven volts to nine volts. These thresholds may be typical for a standalone controller device (see FIG. 2).

For a power electronics device that includes multiple controller devices, the controller devices may be arranged in a master-slave relationship whereby the master controller device is able to command and control the slave controller device. In such examples, a controller device may be configured to function as a slave controller device in a startup sequence. The slave controller device may be configured to start operating as soon as the master controller device is operating and the auxiliary voltage supply is available. In some examples, the slave controller device may be configured to operate when the master controller device provides an auxiliary supply voltage to the slave controller device. In some examples, it may not be desirable for the power electronics device to pre-charge the power supplies for the slave controller device and the master controller device in the same way. Pre-charging the two power supplies in same way may result in additional startup delay time and higher bill-of-materials (BOM) costs for the controller devices and the power electronics device.

The auxiliary voltage supply may be a pre-regulated voltage supply on the order of twelve volts. The slave controller device may be configured to start operating as soon as the auxiliary voltage supply is available. A VCC pin of the slave controller device may be electrically connected to the auxiliary voltage supply. The auxiliary voltage supply may not reach sixteen volts or twenty-five volts, so it may be desirable for the slave controller device to be configured to have a lower turn-on voltage threshold than the turn-on voltage threshold of a corresponding master controller device. A typical turn-on voltage threshold for a slave controller device may be on the order of nine volts to eleven volts.

FIG. 1 is circuit and block diagram of a power electronics device 100 including two controller devices 120 and 122, in accordance with some examples of this disclosure. FIG. 1 depicts power electronics device 100 with a separate flyback stage 114 configured to generate and deliver an auxiliary standby supply to auxiliary supply node 140 and a combination controller device 122 driving power factor correction (PFC) stage 110 and inductor-inductor-capacitor (LLC) stage 112. Combination controller device 122 may operate as a slave in the startup sequence, and flyback controller device 120 may supply generate an auxiliary power supply for combination controller device 122 by closing standby switch 144. During standby operation, combination controller device 122 may be off. Many computer power supplies are built according to this architecture.

Power electronics device 100 may be configured to receive alternating-current (AC) electricity at the AC line input. The AC line of power electronics device 100 input may be configured to electrically connect to and receive power from a power source such as an electrical grid. Power electronics device 100 may be configured to generate a main output at output nodes 160. Output nodes 160 may be configured to deliver electrical power to devices such as servers, rack computers, desktop computers, televisions, electronic devices, electrical motors, white goods (e.g., appliances), home automation, luminaires, and/or any other suitable device. In the example of a computer, output nodes 160 may deliver a twelve-volt power supply.

In some examples, output nodes 160 may be configured to deliver electrical power to resistive loads and/or to inductive loads. Examples of inductive loads may include actuators, motors, and pumps used in one or more of heating, air condition, water supply, a fan, or other systems that include inductive loads. In some examples, output nodes 160 may be configured to deliver electrical power to capacitive loads through, for example, an inverter circuit. Examples of capacitive loads may include lighting elements, such as a Xenon arc lamp. In yet other examples, loads may be combinations of resistive, inductive and capacitive loads.

Rectification circuitry 130 may be configured to receive and rectify AC electricity from the AC line input. Rectification circuitry 130 may also be configured to deliver the rectified AC electricity to PFC stage 110, flyback stage 114, and startup resistor 132. In some examples, the rectified AC electricity may include half-wave rectified electricity and/or full-wave rectified electricity.

PFC stage 110 may include an SMPS circuit and may be configured to convert the rectified AC electricity to better match the electrical load connected to output nodes 160. PFC stage 110 may be configured to generate and deliver corrected electricity to LLC stage 112. Smoothing capacitor 150 may be configured to smooth fluctuations in the corrected electricity. LLC stage 112 may be configured to generate and deliver a direct-current (DC) electrical signal to an electrical load connected to output nodes 160. LLC stage 112 may provide galvanic isolation between the input nodes of power electronics device 100 and output nodes 160.

Flyback stage 114 may include an SMPS circuit and may be configured to generate and deliver a standby electrical signal to the standby output at standby nodes 162. In the example of a computer, standby nodes 162 may deliver a standby power supply to the keyboard, universal serial bus (USB), and/or other devices. During standby mode, both PFC stage 110 and LLC stage 112 may be turned off, while flyback stage 114 may continue operating. Standby mode may also be called a startup mode or a low-power mode. However, the terms "low-power mode" and "wakeup" may be used for a power-saving mode triggered by external events. Typically, the power consumption in "startup mode" is even lower than in "low-power mode." When the voltage level of a VCC pin goes below a UVLO threshold, the term "UVLO mode" can also be used, as the controller device is not in startup mode, but the characteristics of the mode may be the same or similar. Sometimes the term "UVLO mode" may also be used for startup before the voltage level of the VCC pin reaches VCCon.

Flyback controller device 120 may be configured to receive the rectified AC electricity through startup device 134 and startup resistor 132. In some examples, startup device 134 may include a depletion switch or junction gate field-effect transistors (JFET). In some examples, startup device 134 may be a part of flyback controller device 120 and may be integrated in a single integrated circuit (IC) package with other components of flyback controller device 120. In some examples, startup device 134 may be a high-voltage device with a voltage rating on the order of six hundred volts. In some examples, the voltage drop across startup resistor 132 may be approximately four hundred volts, and the electrical current through startup device 134 may be on the order of one milliampere. Therefore, the power dissipation in startup resistor 132 may be approximately four hundred milliwatts until flyback controller device 120 delivers a control signal to startup device 134 to cause startup device 134 to refrain from conducting electricity.

The rectified AC electricity may flow through startup device 134 to auxiliary supply node 140. Auxiliary supply node 140 may be electrically connected to flyback stage 114, flyback controller device 120, and combination controller device 122. Auxiliary supply node 140 may be electrically connected to a power supply (VCC) pin of flyback controller device 120. Standby switch 144 may be configured to open during a standby mode to cease supplying power to power supply node 142. If startup device 134 is integrated within an IC package of flyback controller device 120, the high-voltage (HV) pin of flyback controller device 120 may be electrically connected to the node between startup resistor 132 and startup device 134. In some examples, startup resistor 132 may also be integrated within the IC package of flyback controller device 120. Combination controller device 122 may include an HV pin that is left open or electrically connected to a reference voltage.

During a startup sequence of power electronics device 100, the rectified AC electricity may flow through startup resistor 132 and startup device 134 to charge capacitor 136. The voltage level of the VCC pin may depend on the voltage level of the HV pin and/or the current level of the HV pin, which may be a node between startup resistor 132 and startup device 134. For the configuration of FIG. 1, the voltage level of the VCC pin of flyback controller device 120 may reach twenty volts.

During a startup sequence (i.e., a startup phase), flyback controller device 120 may start up first, and then combination controller device 122 may start up. Flyback controller device 120 may be configured to operate on a relatively low-voltage DC power supply. Flyback controller device 120 may be configured to use the energy stored in capacitor 136 during the startup sequence because an auxiliary power supply may not be available from flyback stage 114. During the startup sequence, auxiliary supply node 140 may receive power from startup resistor 132 and startup device 134. Once auxiliary supply node 140 has a sufficient voltage, standby switch 144 may be closed, and combination controller device 122 may receive electrical power from power supply node 142 through a VCC pin.

As flyback controller device 120 starts up, the voltage across capacitor 136 may be approximately twenty volts. During the first cycles of operation of flyback controller device 120, the voltage across capacitor 136 may decrease from twenty volts to ten volts. After the first cycles of operation, flyback stage 114 may provide the auxiliary supply voltage at auxiliary supply node 140. In some examples, flyback stage 114 may include an auxiliary winding configured to deliver power to the auxiliary supply node 140. The auxiliary supply voltage during normal operation may be approximately ten volts, twelve volts, or fourteen volts on primary side. On the secondary side, which may correspond to a secondary winding of flyback stage 114, the auxiliary supply voltage may be approximately five volts.

A VCC pin of flyback controller device 120 may be configured to receive the auxiliary supply voltage, and a VCC pin of combination controller device 122 may be configured to receive the auxiliary supply voltage through standby switch 144. In some examples, combination controller device 122 may enter a normal operation mode after standby switch 144 is closed and power supply node 142 receives electrical power from auxiliary supply node 140. In some examples, if the HV pin of combination controller device 122 is left open (e.g., disconnected) or connected to a reference voltage, the VCC pin of combination controller device 122 may not reach twenty volts. Therefore, it may be desirable for combination controller device 122 to have a turn-on voltage threshold that is less than a turn-on voltage threshold of flyback controller device 120.

Figure 2:
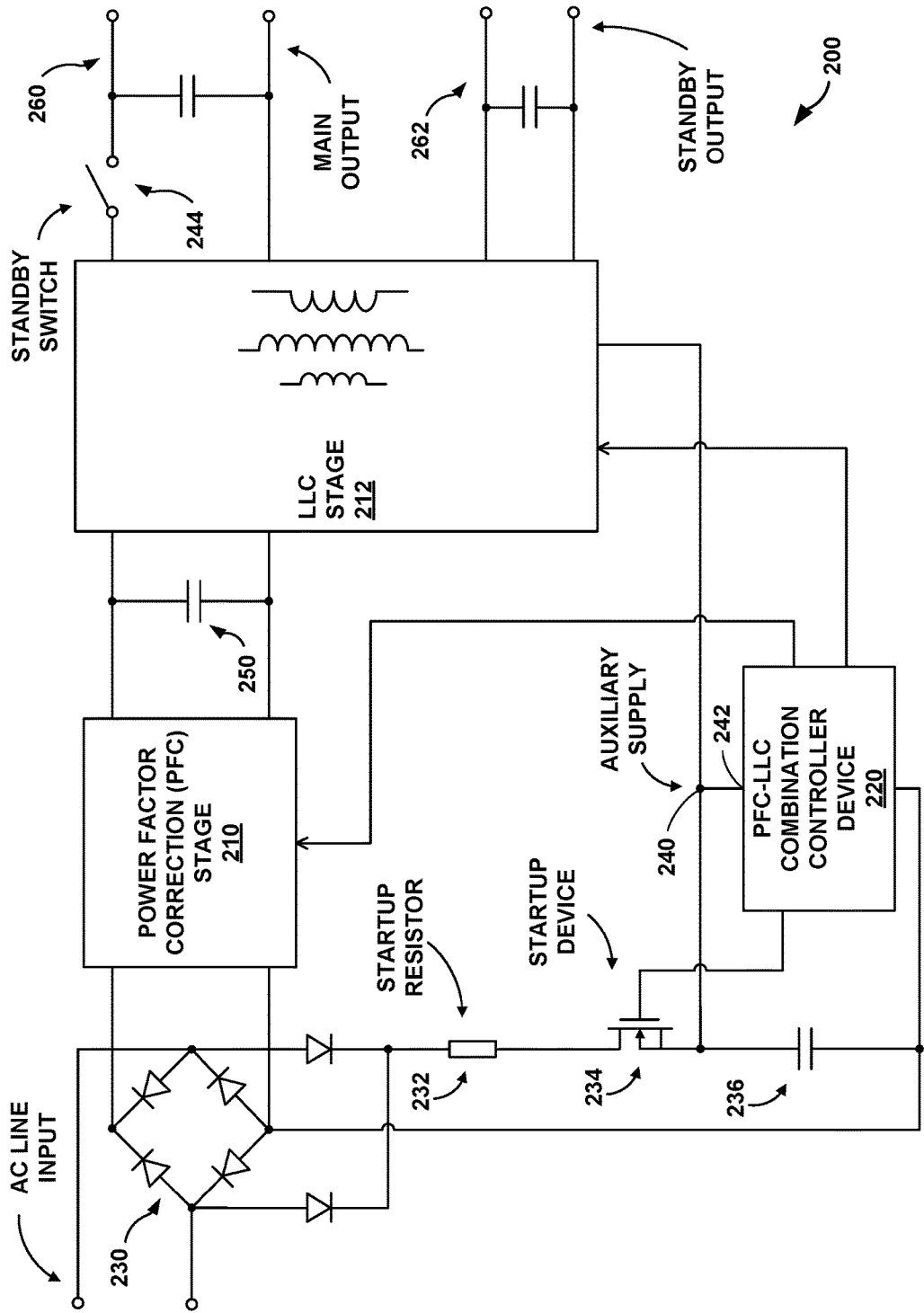
FIG. 2 is circuit and block diagram of a power electronics device including one controller device, in accordance with some examples of this disclosure.

FIG. 2 is circuit and block diagram of power electronics device 200 including one controller device 220, in accordance with some examples of this disclosure. FIG. 2 depicts an example block diagram for another power electronics device 200 where the main LLC stage 212 generates the standby power supply in burst mode operation. Power electronics device 200 may not necessarily include a separate flyback stage. Combination controller device 220 may operate as a standalone controller device and may be the first and only controller device in the startup sequence. Many TV power supplies are built according to this architecture.

LLC stage 212 may be configured to generate and deliver a standby output voltage to standby nodes 262. During standby mode, standby switch 244 may be opened and output nodes 260 may be disconnected from LLC stage 212. Combination controller device 220 may be configured to operate on an auxiliary power supply of approximately twenty volts from auxiliary supply node 240 at startup. During the first cycles of operation of LLC stage 212, the voltage across capacitor 236 may decrease to approximately ten volts as combination controller device 220 consumes some of the electrical power stored by capacitor 236. Thereafter, LLC stage 212 may be configured to generate and deliver the auxiliary power supply to auxiliary supply node 240.

In some examples, combination controller device 220 may have a turn-on voltage threshold of approximately twenty volts. Combination controller device 122 in FIG. 1 may have a turn-on voltage threshold of approximately ten volts. Typically, combination controller device 122 and combination controller device 220 may be different products. To manufacture a single controller device configured to operate as either combination controller device 122 or combination controller device 220, the turn-on voltage threshold of the single controller device may be adjustable.

The single controller device may include level detection circuitry configured to determine the turn-on voltage threshold based on the voltage level or current level of an HV pin of the single controller device. For example, the voltage level or the current level of the HV pin of combination controller device 220 may be higher than the voltage level or current level of the HV pin of combination controller device 122 because the HV pin of combination controller device 220 may be electrically connected to startup resistor 232. The HV pin of combination controller device 122 may be left open or electrically connected to a reference voltage, such as reference ground. Having an adjustable turn-on voltage threshold may increase the functionality, reduce the cost, and keep the pin count low by allowing a single controller device to function as combination controller device 122 or combination controller device 220 without any additional pins. In addition, the design and programming of the startup sequence of power electronics devices 100 and 200 may be quicker and easier because the programmer may be able to set the hysteresis thresholds to lower voltage levels during programming and testing.

It may be desirable for an SMPS controller device to have the capability to operate as a standalone controller device, as a first controller device in a startup sequence, and/or as a slave controller device in a power electronics device that includes more than one controller device. One main motivation for this capability may be the reduction of the logistic costs for manufacturing, stocking, and selling one or more derivate controller devices. In some examples, a controller device with a configurable turn-on voltage threshold may simplify the design and programming of the startup sequence for the controller device. In some examples, a controller device with a configurable turn-on voltage threshold may also shorten the time duration of the startup sequence by providing a setting with lower thresholds to allow quicker charge and discharge cycles.

Some controller devices for power electronics devices may be available as two derivate controller devices with different turn-on thresholds, but all other functions and data of the controller devices may be identical. A metal mask that changes a voltage divider for the turn-on threshold may generate these two derivate controller devices. Some controller devices may include bond option variants, where an additional bond wire may connect a second VCCon comparator with a lower threshold to a VCC pin. If the bond wire is left out, only the first VCCon comparator with higher threshold may determine the turn-on voltage threshold. If the controller device has a startup device (e.g., a depletion switch) integrated by multichip assembly, there may be cost savings for omitting the startup device for a derivate product that operates as a slave controller device with different bonding than another controller device. Using a separate pin to configure a VCCon threshold (e.g., turn-on threshold) may not be desirable because the pin count of a controller device may be one of the major cost drivers for low-cost integrated circuits (ICs) like SMPS controller devices.

In accordance with the techniques of this disclosure, a controller device (e.g., combination controller device 220) for a power electronics circuit may include a monolithic integrated startup transistor (e.g., startup device 234), such as a depletion switch or a JFET. The cost savings of omitting the startup transistor may be marginal such that a second derivate product may not be cost-effective. The controller device may be used as a standalone controller device (e.g., combination controller device 220) or as a first controller device in a multiple-controller-device power electronics device (e.g., flyback controller device 120). The controller device may be configured to generate its own supply through an auxiliary winding. The depletion startup transistor may be configured to carry electrical current while the voltage level rises to the turn-on threshold.

If the controller device operates as a slave controller device, such as combination controller device 122, the controller device may receive the power supply directly from the supply pin (e.g., power supply node 142) and not through a startup transistor. These two cases may be distinguished internally. There are also several options for how the unused pin (e.g., the HV pin) for the startup electrical current may be connected externally in the slave controller case. First, the unused pin may be left open; second, the unused pin may be electrically connected to the controller supply VCC pin; third, the unused pin may be electrically connected to a reference potential (GND). One or more of these options may activate a test mode or a programming mode. For example, if the controller device may be programmed at five-volt supply, the turn-on voltage threshold may be switched to 4.75 volts, for example, by connecting the startup current pin (e.g., the HV pin) directly to GND or any other suitable reference voltage. By connecting the HV pin to a reference voltage for a lower turn-on voltage threshold, the programming and design of the startup sequence may be quicker and easier.

A programmer may test the controller device during a production test or while in a programming mode. For higher turn-on voltage thresholds, each test cycle may take a longer duration of time because the tester may need to bring up the voltage level of the VCC pin to the higher turn-on voltage threshold (e.g., twenty volts) before bringing the voltage level of the VCC pin down to the test voltage (e.g., twelve volts). The level detection circuitry may be configured to determine that the HV pin is electrically connected to a reference voltage and determine a lower turn-on voltage threshold (e.g., the VCCon threshold) and a lower UVLO threshold (e.g., the VCCoff threshold). The lower thresholds may therefore speed up the testing process by turning on and off the controller device with smaller voltage swings.

Figure 3:
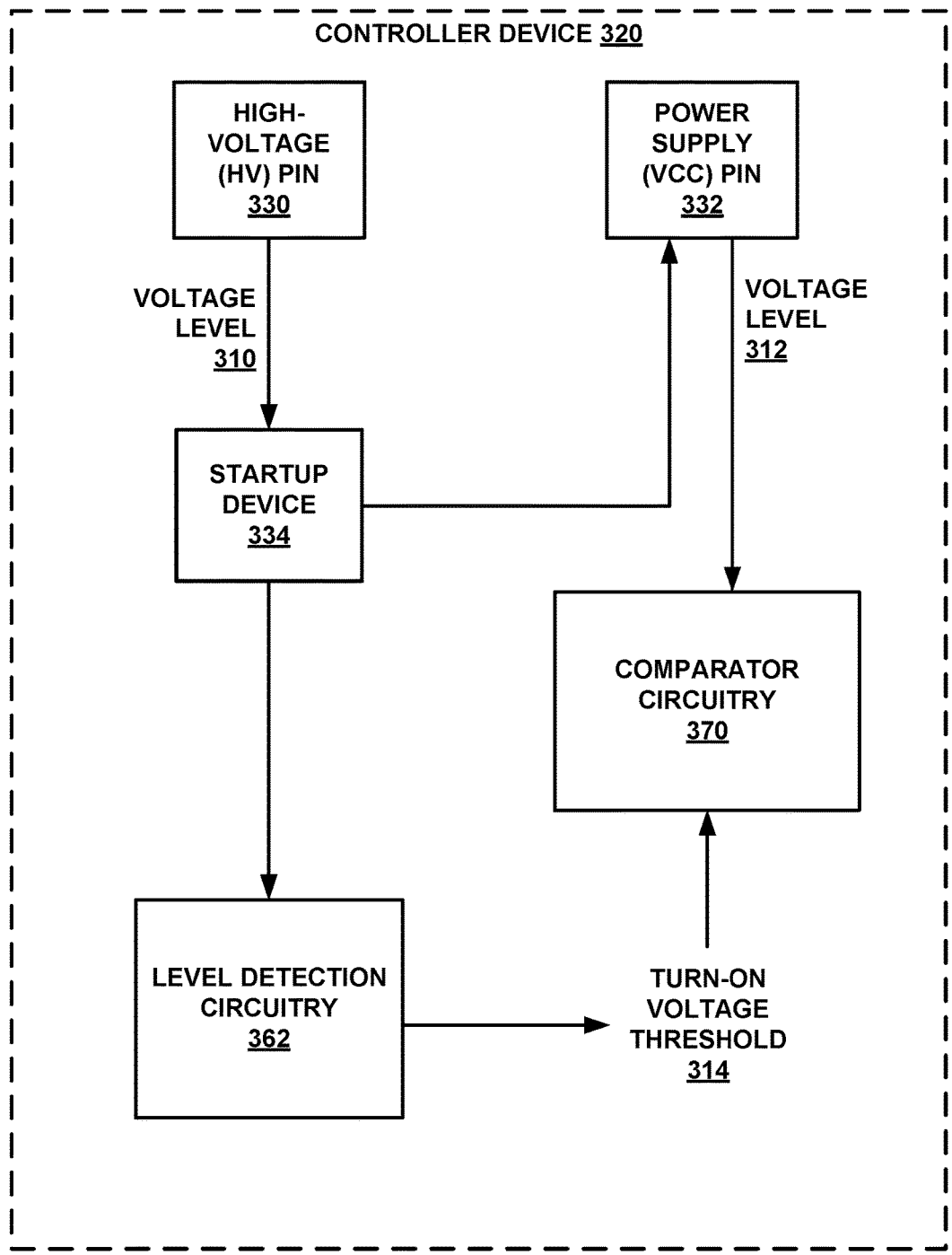
FIG. 3 is a conceptual block diagram of a controller device configured to control a power electronics circuit, in accordance with some examples of this disclosure.

FIG. 3 is a conceptual block diagram of a controller device 320 configured to control a power electronics circuit, in accordance with some examples of this disclosure. Controller device 320 may include HV pin 330, VCC pin 332, startup device 334, level detection circuitry 362, and comparator circuitry 370. In some examples, HV pin 330, VCC pin 332, startup device 334, level detection circuitry 362, and comparator circuitry 370 may be integrated into a single IC package with pins 330 and 332 at least partially exposed on the surface of the package. Controller device 320 may be configured to control the operation of a flyback circuit, an LLC circuit, and/or a PFC circuit.

HV pin 330 may be configured to receive rectified AC electricity from a rectification circuit. The rectified AC electricity may flow through startup device 334 to VCC pin 332 and level detection circuitry 362. During a startup sequence, VCC pin 332 may not receive auxiliary power before the SMPS circuit is operating. Thus, rectified AC electricity may flow from HV pin 330 through startup device 334 to VCC pin 332. Level detection circuitry 362 may be configured to detect a current flow from HV pin 330 through startup device 334 to VCC pin 332. Level detection circuitry 362 may be configured to determine, or set, the turn-on voltage threshold and the UVLO threshold of comparator circuitry 370.

Level detection circuitry 362 may be configured to determine turn-on voltage threshold 314 for comparator circuitry 370 based on a level of HV pin 330, such as the voltage level or the current level of HV pin 330. For example, level detection circuitry 362 may be configured to determine that the voltage level of HV pin 330 is greater than a predetermined threshold and, in response, set turn-on threshold 314 to a first voltage level. In some examples, the first voltage level for turn-on threshold 314 may be in the range of sixteen volts to twenty-five volts, such as twenty volts, or any other suitable voltage level.

Level detection circuitry 362 may be further configured to determine that the voltage level of HV pin 330 is electrically connected to a reference voltage supply, such as a ground voltage, and, in response, set turn-on threshold 314 to a second voltage level. In some examples, the second voltage level for turn-on threshold 314 may be twelve volts, ten volts, five volts, or any other suitable voltage level. Level detection circuitry 362 may be further configured to set turn-on threshold 314 to a third voltage level in response to determining that the voltage level of HV pin 330 is not greater than a predetermined threshold and in response to determining that the voltage level of HV pin 330 is not electrically connected to a reference voltage supply. For example, HV pin 330 may be left open or electrically connected to VCC pin 332. In some examples, the third voltage level for turn-on threshold 314 may be ten volts, twelve volts, fourteen volts or any other suitable voltage level. Level detection circuitry 362 may also be configured to set the UVLO threshold in a similar manner.

Figure 4:
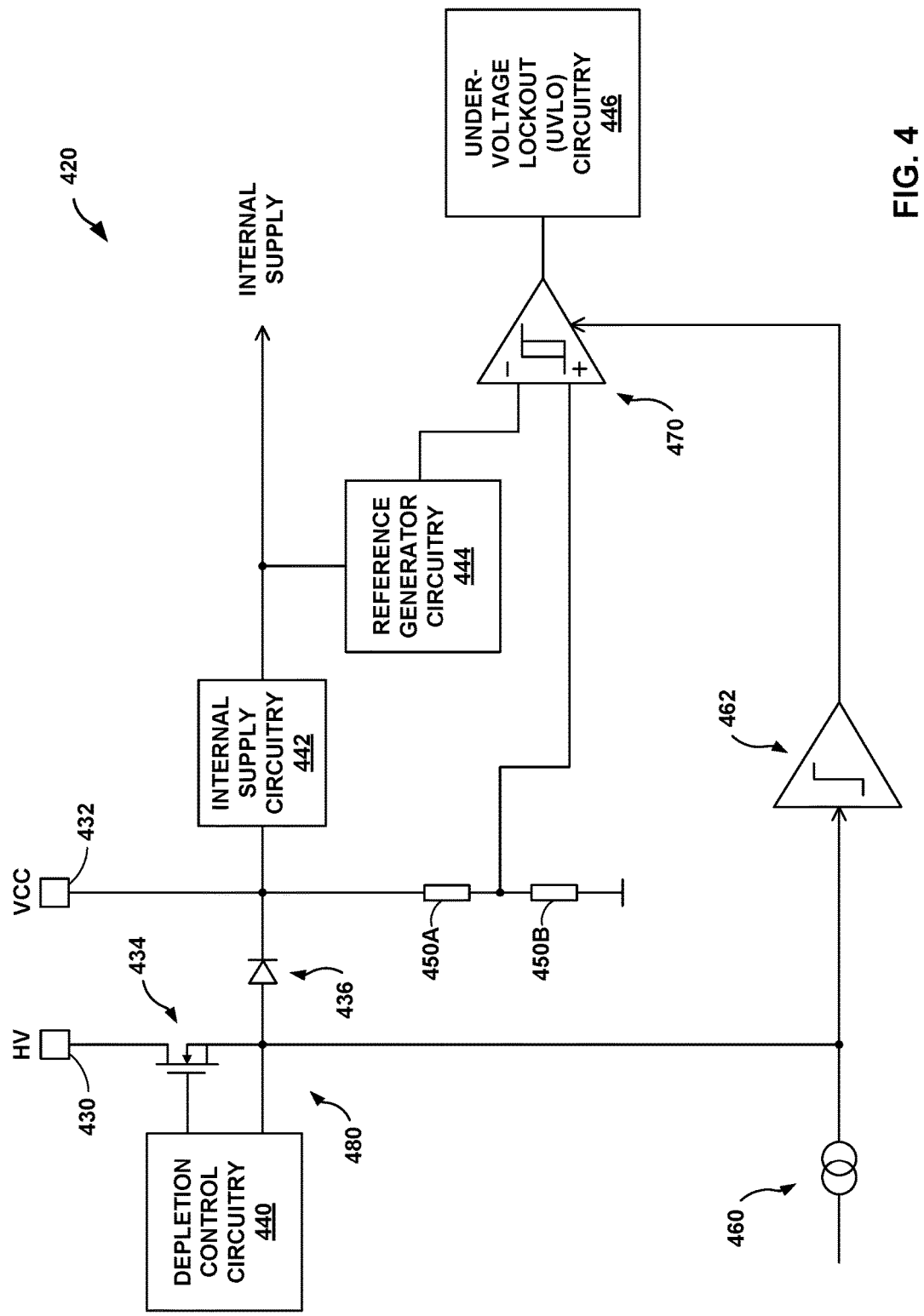
FIG. 4 is circuit and block diagram of a controller device including comparator circuitry and a current source, in accordance with some examples of this disclosure.

FIG. 4 is circuit and block diagram of controller device 420 including comparator circuitry 470 and current source 460, in accordance with some examples of this disclosure. Diode 436 may be electrically connected in series with startup device 434 to prevent reverse discharge of the controller supply (e.g., the energy at VCC pin 432) through startup device 432. Level detection circuitry 462 of controller device 420 may use node 480 between startup device and diode 436 to determine how startup device 434 is connected externally. In some examples, the components of FIG. 4, such as HV pin 430, VCC pin 432, startup device 434, level detection circuitry 462, comparator circuitry 470, may be housed in a single integrated circuit package.

Detecting the level of HV pin 430 may be accomplished by detecting the level at node 480 between startup device 434 and diode 436. During startup mode, startup device 434 may be conducting electricity. When diode 436 is not conducting electricity, the voltage at node 480 may be almost equal to the voltage level of HV pin 430, although current source 460 may introduce minor differences. Detecting that diode 436 is conducting may be sufficient for determining that the voltage level of HV pin 430 is higher than the voltage level of VCC pin 432. An electrical current flowing through startup device 434 and HV pin 430 (higher than the electrical current of current source 460) can only flow while diode 436 is conducting electricity.

HV pin 430 may be configured to pre-charge VCC pin 432 during a startup sequence of controller device 420. During the startup sequence, SMPS circuitry such as flyback circuitry or LLC circuitry (not shown in FIG. 4) may not yet be generating the auxiliary power for VCC pin 432. HV pin 430 may receive rectified AC electricity, and the rectified AC electricity may flow through diode 436 to charge VCC pin 432 and internal supply circuitry 442. Thus, HV pin 430 may provide power for controller device 420 during a startup phase. During the normal operation of controller device 420, the SMPS circuitry may generate and deliver auxiliary power to VCC pin 432. During normal operation, depletion control circuitry 440 may be configured to deliver a control signal to startup device 434 to cause startup device 434 to refrain from conducting electricity from HV pin 430 to diode 436.

Controller device 420 may include current source 460 to determine how the detection behaves in case of an externally unconnected startup device 434. The resistor divider including resistors 450A and 450B for the VCC controller internal supply circuitry 442 may include multiple taps. Internal supply circuitry 442 may be configured to generate a regulated internal supply when the voltage level of VCC pin 432 is higher than four volts or five volts, in some examples. Reference generator circuitry 442 may be configured to generate a signal based on whether the internal supply voltage is greater than a threshold (e.g., a reset threshold). If current source 460 drives positive current to level detection circuitry 462, level detection circuitry 462 may detect a high voltage level of HV pin 430 unless HV pin 430 is electrically connected to a reference voltage (e.g., reference ground), which may be configured to sink the electrical current driven by current source 460. Level detection circuitry 462 may include one or more level detection comparators configured to determine whether diode 436 is forward-biased.

There may be multiple outputs from the reference generator circuitry 444, and comparator circuitry 470 may include multiple comparators to detect different levels of voltage of VCC pin 432. UVLO logic circuitry 446 may be configured to activate other parts of controller device 420 when the voltage of VCC pin 432 is higher than a predetermined level (e.g., the turn-on voltage threshold VCCon). UVLO logic circuitry 446 may be configured to disable the other parts of controller device 420 when the voltage of VCC pin 432 is lower than a UVLO threshold. The UVLO logic may also be configured to control the state of the startup transistor through the depletion control block.

Comparator circuitry 470 may be configured to operate with hysteresis, such that the turn-on voltage threshold is higher than the UVLO threshold, which may be eight volts. In some examples, comparator circuitry 470 may include two or more comparators configured to determine when the voltage level of VCC pin 432 crosses a threshold. When controller device 420 is in startup mode, and the voltage level of VCC pin 432 is higher than the turn-on threshold voltage, comparator circuitry may cause controller device to enter a normal-operation mode. When controller device 420 is in normal-operation mode, and the voltage level of VCC pin 432 is lower than the UVLO threshold, comparator circuitry may cause controller device to enter a startup mode or a low-power mode.

In some examples, if diode 436 is conducting electricity from startup device 434 to VCC pin 432 (e.g., if diode 436 is forward-biased), level detection circuitry 462 may be configured to determine a higher turn-on voltage threshold and a higher UVLO threshold, such as twenty volts and nine volts, respectively. The higher hysteresis thresholds may be appropriate when controller device is used as a flyback controller device or a standalone controller device. If diode 436 is not conducting electricity (e.g., if diode 436 is reverse-biased), level detection circuitry 462 may be configured to determine a lower turn-on voltage threshold and a lower UVLO threshold, such as ten volts and eight volts. The lower hysteresis thresholds may be appropriate when controller device is used as a slave controller device (e.g., combination controller device 122 in FIG. 1). If controller device 420 is used as a slave controller device, HV pin 430 may be disconnected (e.g., left open). If controller device 420 is used as a master controller device (e.g., controller device 220), HV pin 430 may be electrically connected to startup resistor 232.

In startup mode or low-power mode, some of the circuitry of controller device 420 may be disabled by switching off the internal supply lines, switching off the biasing currents, and/or holding digital circuits in the reset state. The circuitry of controller device 420 depicted in FIG. 4 may be configured to remain active during a low-power mode. Controller device 420 may be configured to disable gate driver outputs by placing the outputs in a low state before controller device 420 enters a normal-operation mode. Comparator circuitry 470 may be configured to cause UVLO circuitry 446 to enable or disable the functions of controller device 420 when the voltage level of VCC pin 432 crosses a threshold.

In accordance with the techniques of this disclosure, level detection circuitry 462 may be electrically connected to startup device 434, e.g., the source of a depletion switch. The output of level detection circuitry 462 may be electrically connected to the one or more VCC level comparators of comparator circuitry 470. Level detection circuitry 462 may be configured to switch the thresholds of the VCC level comparators of comparator circuitry 470 and/or to activate or deactivate the comparators of comparator circuitry 470 that are connected to detect different VCC thresholds (e.g., the turn-on voltage threshold and the UVLO threshold).

Controller device 420 may also include an optional bias current source 460 or current sink connected to the input of level detection circuitry 462. If the bias current is positive, level detection circuitry 462 may detect a low level only if HV pin 430 is connected to a reference voltage (e.g., GND) externally. Level detection circuitry 462 may not be configured to distinguish between an open HV pin and an HV pin connected to a positive startup voltage or to VCC. If the bias current is negative, level detection circuitry 462 may be configured to detect a low level if HV pin 430 is connected to GND or left open or, in some examples, connected to VCC pin 432. In this case, level detection circuitry 462 may be configured to detect a high level if HV pin 430 is connected to a positive startup voltage or, in some examples, connected to VCC pin 432. The output of level detection circuitry 462 when HV pin 430 is electrically connected to VCC pin 432 may depend on whether the detection threshold of level detection circuitry 462 is higher or lower than the voltage level of VCC pin 432.

Referring to FIG. 2, if HV pin 430 of controller device 420 is biased from the half wave rectified line without any filtering capacitors, it may appear to level detection circuitry 462 that HV pin 430 is electrically disconnected during the zero crossings of the alternative-current (AC) line voltage. This connection scheme may be used if HV pin 430 is also used for AC detection (detection if the AC is still present or if the mains plug has been disconnected). If level detection circuitry 462 has no measures to filter the unconnected state during AC zero crossings, a positive bias current must be used.

Figure 5:
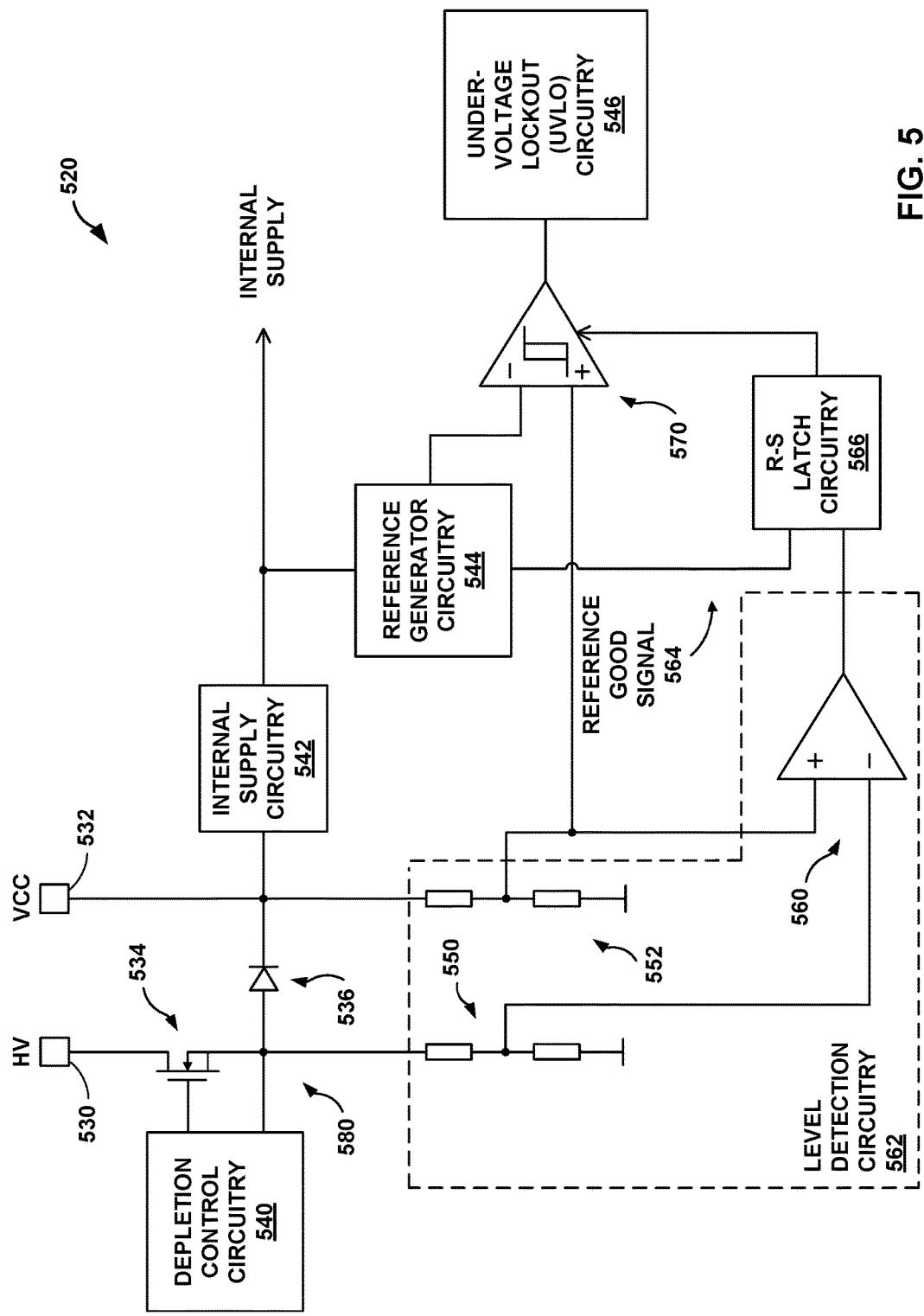
FIG. 5 is circuit and block diagram of a controller device including comparator circuitry and reset-set (R-S) latch circuitry, in accordance with some examples of this disclosure.

FIG. 5 depicts another circuit in a controller device 520 that is configured to determine the state of HV pin 530. Controller device 520 may include two matched voltage dividers 550 and 552 and level detection comparator 560 that are configured to detect the voltage across pre-charge diode 536. In some examples, level detection circuitry 562 of controller device 520 may be configured to detect that HV pin 530 is electrically connected to a positive startup voltage only if the diode is forward biased.

Level detection circuitry 562 may include voltage dividers 550 and 552 and level detection comparator 560. Voltage divider 550 may electrically connected to a first end of diode 536 and may be configured to divide the voltage level of HV pin 530. Voltage divider 552 may electrically connected to a second end of diode 536 and may be configured to divide the voltage level of VCC pin 532. In some examples, voltage dividers 550 and 552 may include resistors and/or capacitors. Level detection comparator 560 may be configured to determine whether diode 536 is forward-biased by comparing the divided voltage signal of voltage divider 550 and the divided voltage signal of voltage divider 552. Level detection circuitry 562 may be configured to set higher hysteresis thresholds in response to level detection comparator 560 determine that diode 536 is forward-biased and to set lower hysteresis thresholds in response to level detection comparator 560 determine that diode 536 is not forward-biased.

The circuit of FIG. 5 may also include R-S-latch circuitry 566 that can be configured to store a bit that indicates whether pre-charge diode 536 has been forward biased at least once. In particular, R-S latch circuitry 566 may be configured to store the bit in response to level detection circuitry 562 determining that the voltage level or the current level of HV pin 430 is greater than a predetermined threshold. Controller device 520 may use the storage of this bit to filter the AC zero crossings in case HV pin 530 is connected as shown in FIG. 2. Without the stored bit, the voltage level of HV pin 530 may fall below the UVLO threshold during an AC zero crossing, and level detection circuitry 562 may set lower hysteresis threshold in response. The rectified AC electricity received by HV pin 530 may fall below a predetermined threshold once during each half wave, causing level detection circuitry 562 to determine lower hysteresis thresholds in response to the low point in each half wave.

R-S-latch circuitry 566 may be configured to reset the bit in response to reference good signal 564 when the voltage level of VCC pin 532 goes below a level at which reference generator circuitry 544 cannot provide reference good signal 564 anymore (e.g., a reset threshold). Reference generator circuitry 544 may be configured to deliver reference good signal 564 unless the voltage level of VCC pin 532 is less than a reset threshold, which may be lower than the UVLO threshold. In some examples, the reset threshold may be approximately four volts or five volts. Level detection circuitry 562 may be configured to determine the turn-on voltage threshold and the UVLO threshold in response to a value of the bit, such that a high value of the bit may result in higher thresholds and a low value of the bit may result in lower thresholds. Thus, R-S latch circuitry 566 may prevent level detection circuitry 562 from setting lower hysteresis thresholds for comparator circuitry 570.

Controller device 520 may be configured to control a power electronics device and may include an integrated startup device 534 for pre-charging the power supply of controller device 520 (e.g., internal supply circuitry 542). The turn-on voltage threshold of controller device 520 may depend on the voltages and/or currents present at startup device 534. The voltages and/or currents at startup device 534 may indicate whether the power supply is pre-charged through startup device 534. The voltages and/or currents at startup device 534 may also indicate whether startup device 534 is connected in a different way that excludes the power supply being pre-charged through startup device 534.

Figure 6:
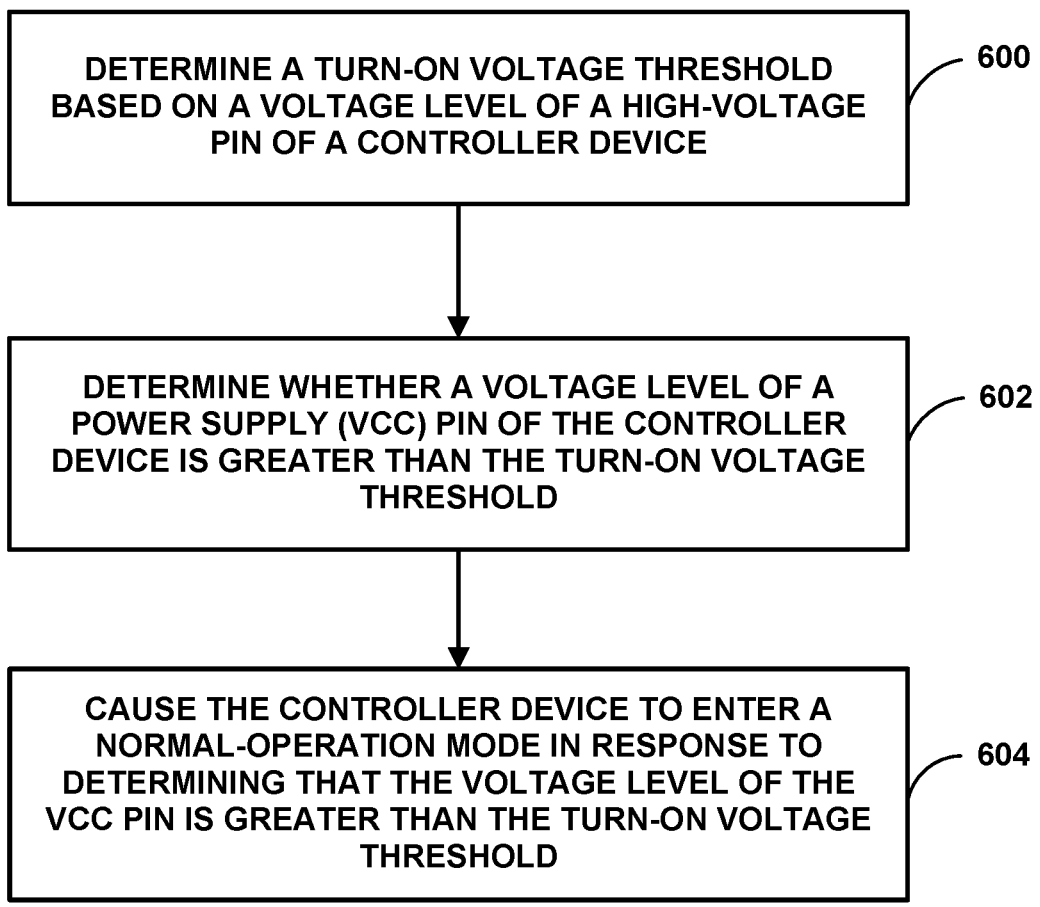
FIG. 6 is a flowchart illustrating example techniques for determining a turn-on voltage threshold of a controller device, in accordance with some examples of this disclosure.
Figure 7:
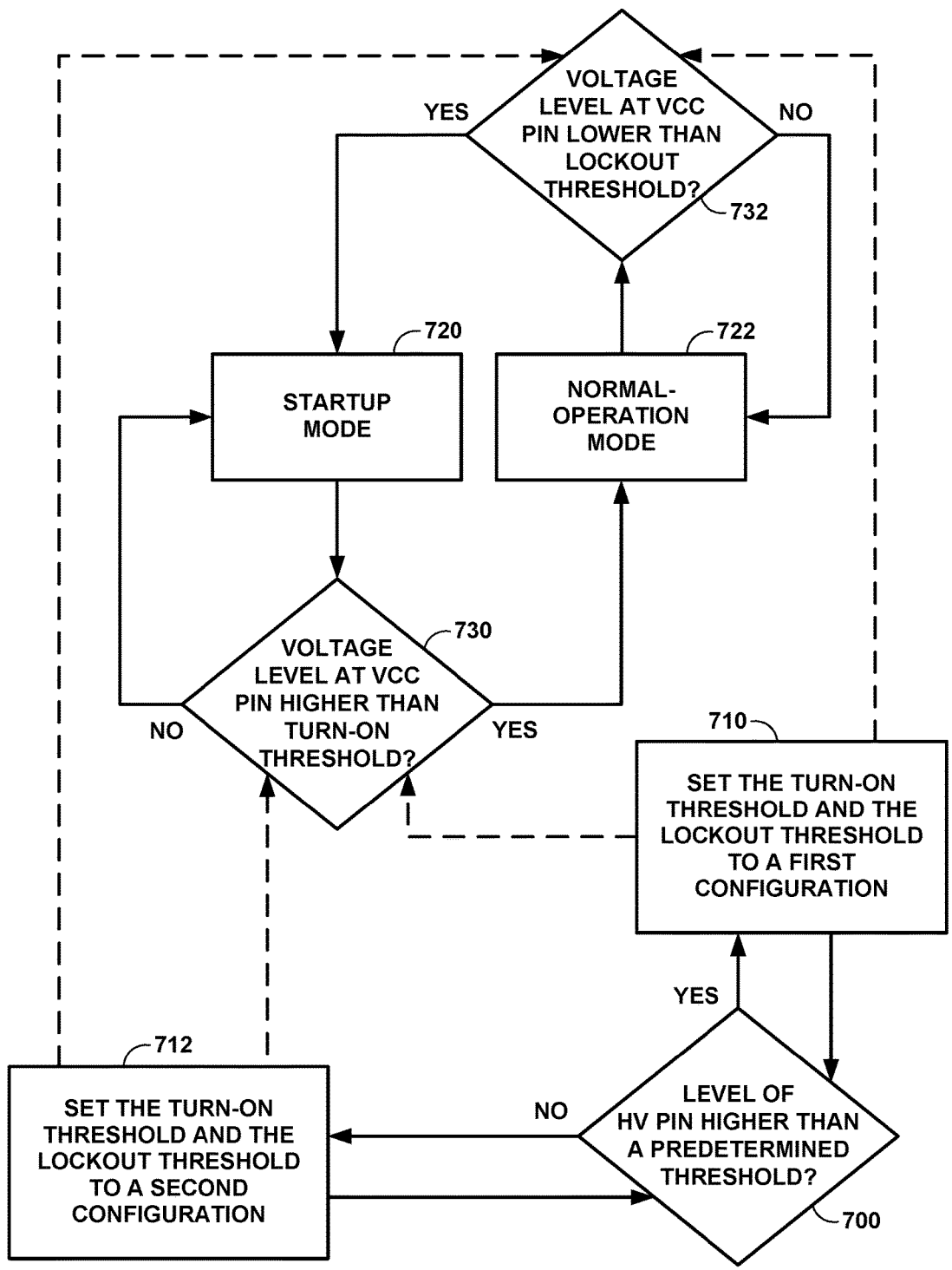
FIG. 7 is a flowchart illustrating example techniques for configuring the voltage thresholds of a controller device, in accordance with some examples of this disclosure.

FIG. 6 is a flowchart illustrating example techniques for determining a turn-on voltage threshold of a controller device, in accordance with some examples of this disclosure. The techniques of FIGS. 6 and 7 are described with reference to controller device 420 in FIG. 4, although other components, such as controller devices 120, 122, 220, 320, and 520 in FIGS. 1-3 and 5, may exemplify similar techniques.

In the example of FIG. 6, level detection circuitry 464 may be configured to determine a turn-on voltage threshold based on a level of HV pin 430 of controller device 420 (600). Level detection circuitry 464 may be configured to determine a higher turn-on threshold and a higher UVLO threshold in response to determining that diode 436 is forward-biased. Level detection circuitry 464 may be configured to determine a lower turn-on threshold and a lower UVLO threshold in response to determining that diode 436 is not forward-biased.

In the example of FIG. 6, comparator circuitry 470 may be configured to determine whether a voltage level of VCC pin 432 of controller device 420 is greater than a turn-on voltage threshold (602). Comparator circuitry 470 may include one or more comparators configured to compare the voltage level of VCC pin 432 to the turn-on voltage threshold. The turn-on voltage threshold may be ten volts for lower voltage levels at HV pin 430, and the turn-on voltage threshold may be twenty volts for higher voltage levels at HV pin 430.

In the example of FIG. 6, comparator circuitry 470 may be further configured to cause controller device 420 to enter a normal-operation mode in response to determining that the voltage level of VCC pin 432 is greater than the turn-on voltage threshold (604). In some examples, comparator circuitry 470 may cause UVLO logic circuitry to activate controller device 420. During the normal-operation mode, controller device 420 may be configured to control the operation of an SMPS circuit. After a number of cycles of operation (e.g., one thousand cycles), the SMPS circuit may be configured to generate and deliver an auxiliary power supply to VCC pin 432.

FIG. 7 is a flowchart illustrating example techniques for configuring the voltage thresholds of a controller device, in accordance with some examples of this disclosure. In the example of FIG. 7, level detection circuitry 462 may be configured to determine whether the voltage level or the current level of HV pin 430 is higher than a predetermined threshold (700). If the level of HV pin 430 is higher than the predetermined threshold, level detection circuitry 462 may be configured to set a turn-on threshold and a UVLO threshold to a first configuration (710). If the level of HV pin 430 is not higher than the predetermined threshold, level detection circuitry 462 may be configured to set the turn-on threshold and the UVLO threshold to a second configuration (712). In some examples, the turn-on threshold and the UVLO threshold of the second configuration may be lower than the turn-on threshold and the UVLO threshold of the first configuration.

During startup mode (720), comparator circuitry 470 may be configured to determine whether the voltage level at VCC pin 432 is higher than the turn-on threshold (730). If the voltage level at VCC pin 432 is higher than the turn-on threshold during startup mode, comparator circuitry 470 may be configured to cause controller device 420 to enter normal-operation mode (722). If the voltage level at VCC pin 432 is not higher than the turn-on threshold during startup mode, comparator circuitry 470 may be configured to cause controller device 420 to remain in startup mode (720).

During normal-operation mode (722), comparator circuitry 470 may be configured to determine whether the voltage level at VCC pin 432 is lower than a UVLO threshold (732). If the voltage level at VCC pin 432 is lower than the UVLO threshold during normal-operation mode, comparator circuitry 470 may be configured to cause controller device 420 to enter startup mode (720). If the voltage level at VCC pin 432 is not lower than the UVLO threshold during normal-operation mode, comparator circuitry 470 may be configured to cause controller device 420 to remain in normal-operation mode (722).

The techniques of this disclosure may be implemented in a device or article of manufacture comprising analog circuitry or mixed analog/digital circuitry. The analog circuitry may include passive components, such as resistors, capacitors, inductors, and diodes. In addition or in the alternative, the analog circuitry may include active components, such as transistors and other active devices. Mixed analog/digital circuitry may also include logic gate circuitry made up of switches.

Elements of controller devices 120, 122, 220, 320, 420, and/or 520 may be implemented in any of a variety of types of solid state circuit elements, such as CPUs, CPU cores, GPUs, digital signal processors (DSPs), application-specific integrated circuits (ASICs), a mixed-signal integrated circuits, field programmable gate arrays (FPGAs), microcontrollers, programmable logic controllers (PLCs), programmable logic device (PLDs), complex PLDs (CPLDs), a system on a chip (SoC), any subsection of any of the above, an interconnected or distributed combination of any of the above, or any other integrated or discrete logic circuitry, or any other type of component or one or more components capable of being configured in accordance with any of the examples disclosed herein. Processing circuitry may also include analog components arranged in a mixed-signal IC.

Controller devices 120, 122, 220, 320, 420, and/or 520 may include memory. One or more memory devices of the memory may include any volatile or non-volatile media, such as a RAM, ROM, non-volatile RAM (NVRAM), electrically erasable programmable ROM (EEPROM), flash memory, and the like. One or more memory devices of the memory may store computer readable instructions that, when executed by the processing circuitry, cause the processing circuitry to implement the techniques attributed herein to the processing circuitry.

The techniques of this disclosure may be implemented in a wide variety of computing devices. Any components, modules or units have been described to emphasize functional aspects and does not necessarily require realization by different hardware units. The techniques described herein may be implemented in hardware, software, firmware, or any combination thereof. Any features described as modules, units or components may be implemented together in an integrated logic device or separately as discrete but interoperable logic devices. In some cases, various features may be implemented as an integrated circuit device, such as an integrated circuit chip or chipset.

The following numbered examples demonstrate one or more aspects of the disclosure.

EXAMPLE 1

A controller device is configured to control power electronics circuitry and includes a high-voltage (HV) pin, a power supply (VCC) pin, a startup device configured to conduct electricity from the HV pin to the VCC pin, and comparator circuitry configured to determine whether a voltage level of the VCC pin is greater than a turn-on voltage threshold. In some examples, the comparator circuitry is further configured to cause the controller device to enter a normal-operation mode in response to determining that the voltage level of the VCC pin is greater than the turn-on voltage threshold. In some examples, the controller device also includes level detection circuitry configured to determine the turn-on voltage threshold based on a level of the HV pin.

EXAMPLE 2

The controller device of example 1, wherein the comparator circuitry is further configured to determine whether the voltage level of the VCC pin is less than an undervoltage lockout (UVLO) threshold. The comparator circuitry is further configured to cause the controller device to enter a startup mode in response to determining that the voltage level of the VCC pin is less than the UVLO threshold. The level detection circuitry is further configured to determine the UVLO threshold based on the level of the HV pin.

EXAMPLE 3

The controller device of examples 1-2 or any combination thereof, further including a diode configured to conduct electricity from the startup device to the VCC pin.

EXAMPLE 4

The controller device of examples 1-3 or any combination thereof, wherein the level detection circuitry is further configured to detect a voltage level at a node connecting the diode and the startup device.

EXAMPLE 5

The controller device of examples 1-4 or any combination thereof, further including current source circuitry configured to deliver an electrical current to the level detection circuitry.

EXAMPLE 6

The controller device of examples 1-5 or any combination thereof, wherein the level detection circuitry includes a level detection comparator configured to determine whether the diode is forward-biased. The level detection circuitry is further configured to set the turn-on voltage threshold to a first voltage threshold in response to the level detection comparator determining that the diode is forward-biased. The level detection circuitry is also configured to set the turn-on voltage threshold to a second voltage threshold in response to the level detection comparator determining that the diode is not forward-biased, wherein the first voltage threshold is greater than the second voltage threshold.

EXAMPLE 7

The controller device of examples 1-6 or any combination thereof, further including a first voltage divider electrically connected to a first end of the diode and configured to generate a first divided voltage signal and a second voltage divider electrically connected to a second end of the diode and configured to generate a second divided voltage signal. The level detection comparator is further configured to determine whether the diode is forward-biased by at least comparing the first divided voltage signal and the second divided voltage signal.

EXAMPLE 8

The controller device of examples 1-7 or any combination thereof, wherein the level detection circuitry is further configured to detect a current flow from the HV pin through the startup device to the VCC pin.

EXAMPLE 9

The controller device of examples 1-8 or any combination thereof, further including a single integrated circuit package, wherein the single integrated circuit package houses the HV pin, the VCC pin, the comparator circuitry, the level detection circuitry, and the startup device.

EXAMPLE 10

The controller device of examples 1-9 or any combination thereof, wherein the startup device includes a depletion switch or a JFET.

EXAMPLE 11

The controller device of examples 1-10 or any combination thereof, further including latch circuitry configured to set a bit in response to the level detection circuitry determining that the level of the HV pin is greater than a predetermined threshold and to reset the bit in response to the voltage level of the VCC pin being less than a reset threshold. A voltage level of the reset threshold is lower than the UVLO threshold, and the level detection circuitry is configured to determine the turn-on voltage threshold in response to a value of the bit.

EXAMPLE 12

The controller device of examples 1-11 or any combination thereof, wherein the level detection circuitry is configured to determine the turn-on voltage threshold by at least setting the turn-on voltage threshold to a first voltage level in response to determining that the level of the HV pin is greater than a predetermined threshold, setting the turn-on voltage threshold to a second voltage level in response to determining that the HV pin is electrically connected to a reference voltage supply, and setting the turn-on voltage threshold to a third voltage level in response to determining that the level of the HV pin is not greater than the predetermined threshold, and further in response to determining that the HV pin is not electrically connected to a reference voltage supply. The first voltage level, the second voltage level, and the third voltage level are different from each other.

EXAMPLE 13

A method for controlling power electronics circuitry by a controller device includes determining a turn-on voltage threshold based on a level of an HV pin of the controller device. The method further includes determining whether a voltage level of a VCC pin of the controller device is greater than the turn-on voltage threshold. The method also includes causing the controller device to enter a normal-operation mode in response to determining that the voltage level of the VCC pin is greater than the turn-on voltage threshold.

EXAMPLE 14

The method of example 13, further including determining a UVLO threshold based on the level of the HV pin, determining whether the voltage level of the VCC pin is less than the UVLO threshold, and causing the controller device to enter a startup mode in response to determining that the voltage level of the VCC pin is less than the UVLO threshold.

EXAMPLE 15

The method of examples 13-14 or any combination thereof, further including determining whether a diode is conducting electricity from the HV pin to the VCC pin. The method also includes setting the turn-on voltage threshold to a first voltage threshold in response to the level detection comparator determining that the diode is conducting electricity from the HV pin to the VCC pin. The method includes setting the turn-on voltage threshold to a second voltage threshold in response to the level detection comparator determining that the diode is not conducting electricity from the HV pin to the VCC pin, wherein the first voltage threshold is greater than the second voltage threshold.

EXAMPLE 16

The method of examples 13-15 or any combination thereof, further including determining whether the voltage level of the HV pin is greater than a predetermined threshold and determining the turn-on voltage threshold in response to determining that the level of the HV pin is greater than the predetermined threshold.

EXAMPLE 17

The method of examples 13-16 or any combination thereof, further including determining if the voltage level of the VCC pin is less than a reset threshold and setting a bit in response to determining that the voltage level of the HV pin is greater than the predetermined threshold. The method also includes resetting the bit in response to determining that the voltage level of the VCC pin is less than the reset threshold and determining the turn-on voltage threshold in response to a value of the bit.

EXAMPLE 18

A power electronics device includes rectification circuitry configured to rectify AC electricity and PFC circuitry configured to receive the rectified AC electricity from the rectification circuitry. The power electronics device also includes SMPS circuitry configured to generate a main power supply and a controller device configured to control the PFC circuitry and the SMPS circuitry. The controller device includes a VCC pin and an HV pin configured to receive the rectified AC electricity from the rectification circuitry and to pre-charge the VCC pin during a startup sequence. The controller device also includes a startup device configured to deliver the rectified AC electricity from the HV pin to the VCC pin. The controller device further includes comparator circuitry configured to determine whether a voltage level of the VCC pin is greater than a turn-on voltage threshold. The comparator circuitry is also configured to cause the controller device to enter a normal-operation mode in response to determining that the voltage level of the VCC pin is greater than the turn-on voltage threshold. The controller device includes level detection circuitry configured to determine the turn-on voltage threshold based on a level of the HV pin.

EXAMPLE 19

The power electronics device of example 18, wherein the comparator circuitry of the controller device is further configured to determine whether the voltage level of the VCC pin is less than a UVLO threshold. The comparator circuitry is further configured to cause the controller device to enter a low-power mode in response to determining that the voltage level of the VCC pin is less than the UVLO threshold. The level detection circuitry is further configured to determine the UVLO threshold based on the level of the HV pin.

EXAMPLE 20

The power electronics device examples 18-19 or any combination thereof, wherein the controller device further includes a diode configured to conduct electricity from the startup device to the VCC pin. A single integrated circuit package, wherein the single integrated circuit package houses the HV pin, the VCC pin, the comparator circuitry, the level detection circuitry, the diode, and the startup device. The level detection circuitry is further configured to determine whether the diode is forward-biased and to set the turn-on voltage threshold to a first voltage threshold in response to determining that the diode is forward-biased. The level detection circuitry is also configured to reset the turn-on voltage threshold to a second voltage threshold in response to determining that the voltage level of the VCC pin is lower than a reset threshold, wherein the reset threshold is lower than the UVLO threshold, wherein the first voltage threshold is greater than the second voltage threshold.

Various examples of the disclosure have been described. Any combination of the described systems, operations, or functions is contemplated. These and other examples are within the scope of the following claims.

What is claimed is:

1. A controller device configured to control power electronics circuitry, the controller device comprising:
    a high-voltage (HV) pin;
    a power supply (VCC) pin;
    a startup device configured to conduct electricity from the HV pin to the VCC pin;
    comparator circuitry configured to:
        determine whether a voltage level of the VCC pin is greater than a turn-on voltage threshold; and cause the controller device to enter a normal-operation mode in response to determining that the voltage level of the VCC pin is greater than the turn-on voltage threshold; and level detection circuitry configured to determine the turn-on voltage threshold based on a level of the HV pin, wherein the turn-on voltage threshold is adjustable.

2. The controller device of claim 1, wherein the comparator circuitry is further configured to:

determine whether the voltage level of the VCC pin is less than an under-voltage lockout (UVLO) threshold; and cause the controller device to enter a startup mode in response to determining that the voltage level of the VCC pin is less than the UVLO threshold, wherein the level detection circuitry is further configured to determine the UVLO threshold based on the level of the HV pin.

3. The controller device of claim 1, further comprising a diode configured to conduct electricity from the startup device to the VCC pin.

4. The controller device of claim 3, wherein the level detection circuitry is further configured to detect a voltage level at a node connecting the diode and the startup device.

5. The controller device of claim 4, further comprising current source circuitry configured to deliver an electrical current to the level detection circuitry.

6. The controller device of claim 3, wherein the level detection circuitry comprises a level detection comparator configured to determine whether the diode is forward-biased, and wherein the level detection circuitry is further configured to:

set the turn-on voltage threshold to a first voltage threshold in response to the level detection comparator determining that the diode is forward-biased; and set the turn-on voltage threshold to a second voltage threshold in response to the level detection comparator determining that the diode is not forward-biased, wherein the first voltage threshold is greater than the second voltage threshold.

7. The controller device of claim 6, further comprising:

a first voltage divider electrically connected to a first end of the diode and configured to generate a first divided voltage signal; and a second voltage divider electrically connected to a second end of the diode and configured to generate a second divided voltage signal, wherein the level detection comparator is configured to determine whether the diode is forward-biased by at least comparing the first divided voltage signal and the second divided voltage signal.

8. The controller device of claim 1, wherein the level detection circuitry is further configured to detect a current flow from the HV pin through the startup device to the VCC pin.

9. The controller device of claim 1, further comprising a single integrated circuit package, wherein the single integrated circuit package houses the HV pin, the VCC pin, the comparator circuitry, the level detection circuitry, and the startup device.

10. The controller device of claim 1, wherein the startup device includes a depletion switch or a junction gate field-effect transistor (JFET).

11. The controller device of claim 1, further comprising latch circuitry configured to:

set a bit in response to the level detection circuitry determining that the level of the HV pin is greater than a predetermined threshold; and reset the bit in response to the voltage level of the VCC pin being less than a reset threshold, wherein a voltage level of the reset threshold is lower than the UVLO threshold, and wherein the level detection circuitry is configured to determine the turn-on voltage threshold in response to a value of the bit.

12. The controller device of claim 1, wherein the level detection circuitry is configured to determine the turn-on voltage threshold by at least:

setting the turn-on voltage threshold to a first voltage level in response to determining that the level of the HV pin is greater than a predetermined threshold;

setting the turn-on voltage threshold to a second voltage level in response to determining that the HV pin is electrically connected to a reference voltage supply; and setting the turn-on voltage threshold to a third voltage level in response to determining that the level of the HV pin is not greater than the predetermined threshold, and further in response to determining that the HV pin is not electrically connected to a reference voltage supply, wherein the first voltage level, the second voltage level, and the third voltage level are different from each other.

13. A method for controlling power electronics circuitry by a controller device, the method comprising:

determining a turn-on voltage threshold based on a level of a high-voltage (HV) pin of the controller device, wherein the turn-on voltage threshold is adjustable;

determining whether a voltage level of a power supply (VCC) pin of the controller device is greater than the turn-on voltage threshold; and causing the controller device to enter a normal-operation mode in response to determining that the voltage level of the VCC pin is greater than the turn-on voltage threshold.

14. The method of claim 13, further comprising:

determining an under-voltage lockout (UVLO) threshold based on the level of the HV pin;

determining whether the voltage level of the VCC pin is less than the UVLO threshold; and causing the controller device to enter a startup mode in response to determining that the voltage level of the VCC pin is less than the UVLO threshold.

15. The method of claim 13, further comprising:

determining whether a diode is conducting electricity from the HV pin to the VCC pin;

setting the turn-on voltage threshold to a first voltage threshold in response to the level detection comparator determining that the diode is conducting electricity from the HV pin to the VCC pin; and setting the turn-on voltage threshold to a second voltage threshold in response to the level detection comparator determining that the diode is not conducting electricity from the HV pin to the VCC pin, wherein the first voltage threshold is greater than the second voltage threshold.

16. The method of claim 13, further comprising:

determining whether the voltage level of the HV pin is greater than a predetermined threshold; and determining the turn-on voltage threshold in response to determining that the level of the HV pin is greater than the predetermined threshold.

17. The method of claim 16, further comprising:

determining if the voltage level of the VCC pin is less than a reset threshold;

setting a bit in response to determining that the voltage level of the HV pin is greater than the predetermined threshold;

resetting the bit in response to determining that the voltage level of the VCC pin is less than the reset threshold; and determining the turn-on voltage threshold in response to a value of the bit.

18. A power electronics device comprising:

rectification circuitry configured to rectify alternating-current (AC) electricity;

power-factor correction (PFC) circuitry configured to receive the rectified AC electricity from the rectification circuitry;

switched-mode power supply (SMPS) circuitry configured to generate a main power supply; and a controller device configured to control the PFC circuitry and the SMPS circuitry, wherein the controller device includes:

a power supply (VCC) pin;

a high-voltage (HV) pin configured to:
  receive the rectified AC electricity from the rectification circuitry; and
  pre-charge the VCC pin during a startup sequence;

a startup device configured to deliver the rectified AC electricity from the HV pin to the VCC pin;

comparator circuitry configured to:
  determine whether a voltage level of the VCC pin is greater than a turn-on voltage threshold; and
  cause the controller device to enter a normal-operation mode in response to determining that the voltage level of the VCC pin is greater than the turn-on voltage threshold; and level detection circuitry configured to determine the turn-on voltage threshold based on a level of the HV pin, wherein the turn-on voltage threshold is adjustable.

19. The power electronics device of claim 18, wherein the comparator circuitry of the controller device is further configured to:

determine whether the voltage level of the VCC pin is less than an under-voltage lockout (UVLO) threshold; and cause the controller device to enter a low-power mode in response to determining that the voltage level of the VCC pin is less than the UVLO threshold, wherein the level detection circuitry is configured to determine the UVLO threshold based on the level of the HV pin.

20. The power electronics device of claim 18, wherein the controller device further comprises:

a diode configured to conduct electricity from the startup device to the VCC pin; and a single integrated circuit package, wherein the single integrated circuit package houses the HV pin, the VCC pin, the comparator circuitry, the level detection circuitry, the diode, and the startup device, and wherein the level detection circuitry is further configured to:

determine whether the diode is forward-biased;

set the turn-on voltage threshold to a first voltage threshold in response to determining that the diode is forward-biased; and reset the turn-on voltage threshold to a second voltage threshold in response to determining that the voltage level of the VCC pin is lower than a reset threshold, wherein the reset threshold is lower than the UVLO threshold, wherein the first voltage threshold is greater than the second voltage threshold.

* * * * *